Figure 5:
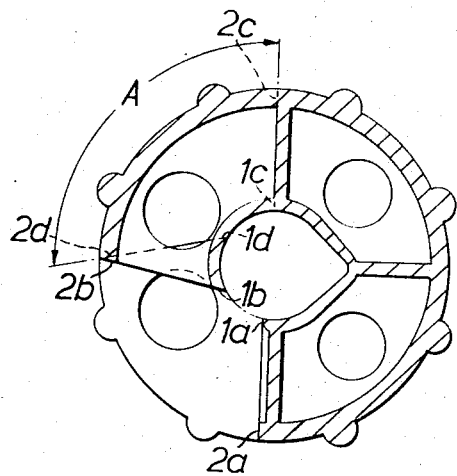

Dec. 20, 1966 — W. STÖBER — 3,292,335
UNITARY FLEXIBLE SPACERS FOR CONCRETE REINFORCEMENT
Filed March 9, 1964 — 2 Sheets-Sheet 1
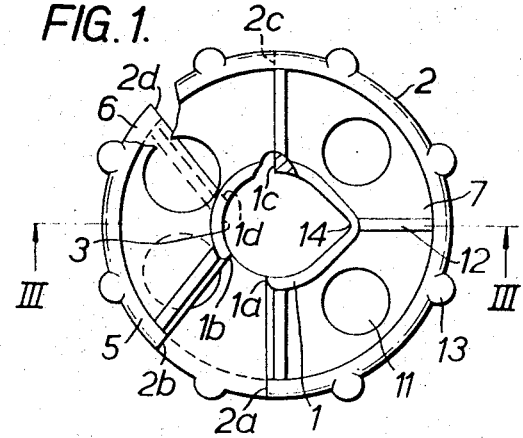
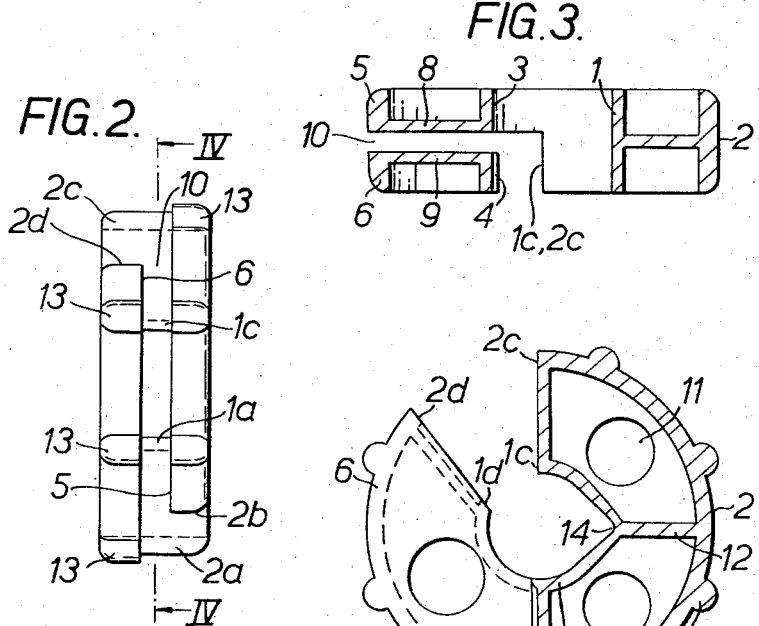
INVENTOR
WILHELM STOBER

United States Patent Office 3,292,335
Patented Dec. 20, 1966

3,292,335
UNITARY, FLEXIBLE SPACERS FOR CONCRETE REINFORCEMENT
Wilhelm Stöber, 17a Bahnhofstrasse, Lehrte, Hannover, Germany
Filed Mar. 9, 1964, Ser. No. 350,394
Claims priority, application Germany, Mar. 20, 1963, St 15,772 (utility model); Oct. 17, 1963, St 21,197
8 Claims. (Cl. 52—677)

This invention relates to spacers for reinforcement rods as used to reinforce concrete, and has for an object to provide a spacer which is simple to apply but less liable to accidental detachment.

One known type of spacer which has the advantage of being convenient to handle consists of a body of resiliently flexible material, such as an elastic metal or a semi-rigid synthetic resin plastic. It consists of a gapped inner ring which embraces the reinforcing rod and a gapped outer concentric ring, the two gaps being radially aligned. The two gaps therefore form an opening which permits the spacer to be sprung sideways on to the reinforcing rod, the latter being more or less tightly gripped by the inner ring, whilst the outer ring bears against the shuttering or some other neighbouring part.

The above described form of construction of a spacer has the drawback that the inner ring can just as easily be pushed off as pushed on to the reinforcement, a circumstance which may, as will be readily understood, completely nullify the intended purpose of the spacer on the reinforcement. Occasions when such a spacer can be pushed off the reinforcement most frequently arise when the gap in the outer ring happens to be located adjacent a neighbouring surface and the reinforcement is bent or deflected in this direction, or when the outer ring is subjected to a force applied perpendicularly to the plane of the ring and is thus tilted when the concrete is poured.

The present invention eliminates the above described drawbacks by providing the inner ring with angularly overlapping end portions where the ring is gapped. Preferably the arrangement is such that the overlapping end portions of the inner ring are of only about half the total axial width or thickness of the ring and that they lie close together in the normal state, whilst the outer ring is similarly provided with narrow overlapping ends, web members connecting the corresponding ends of the inner and outer rings together.

The invention thus provides a spacer in which the opening through which the reinforcing rod can enter the inner ring is normally substantially closed and can be opened (in the preferred form of construction) by axially splaying apart the adjacent overlapping end portions of the outer and inner rings. The oblique slot-shaped opening thus formed permits the spacer to be easily pushed on to the reinforcing rod. As soon as the rod is received into the inner ring and clears the gap, the spacer can be twisted back into a normal plane radial to the reinforcing rod axis, whilst the end portions of the outer and inner ring, together with the web members connecting the same, spring together and thus block the exit from the inner ring. The described arrangement therefore positively prevents such a spacer from being accidentally disloged by radial forces from the reinforcing rod upon which it is mounted.

Figure 6:
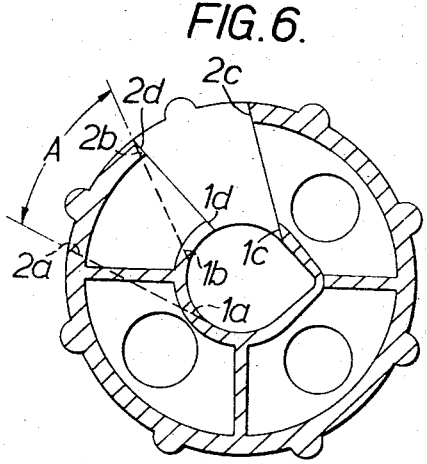

A preferred embodiment of the invention will now be more particularly described, by way of example only, with reference to the accompanying drawings in which:

FIGURE 1 is a front view of the spacer;
FIGURE 2 is a side view seen from the left of FIGURE 1;
FIGURE 3 is a section on the line III—III of FIGURE 1;
FIGURE 4 is a section on the line IV—IV of FIGURE 2, and
FIGURES 5 and 6 are sectional views taken on planes parallel to and immediately behind the front face of FIGURE 1 showing modifications.

The spacer illustrated in the drawings is an integral injection moulding made of an elastically flexible synthetic resin plastic.

The spacer is a generally wheel-like body having a hub and a rim which are constituted by inner and outer rings 1, 2 respectively. These parts are connected by a web 7. The hub or inner ring 1 and the rim or outer ring 2 are relatively wide, or thick in the axial direction, the internal diameter of the hub being such as to allow it to embrace fairly closely a standard or conventional reinforcement rod, whilst the outer diameter of the rim is chosen to suit the required minimum spacing between rods, or between a rod and, say, the shuttering or form into which concrete is to be poured.

Over a large arc, shown in the drawings as subtending an angle of approximately 180°, the hub 1 and rim 2 are peripherally solid, but over their remaining angularly coextensive peripheral arcs they are both interrupted or split by a slot 10 perpendicular to the axis of the bore of the hub so that both the hub and the rim present thin or narrow portions 3, 4 and 5, 6 respectively (see particularly FIGURE 3) which are separated by the slot 10. The slot is flanked on one side by a segment 8 of the web 7 joining the narrow hub and rim portions 3, 5, and on the other side by a similar web segment 9 joining the narrow hub and rim portions 4, 6. Furthermore, both the narrow hub and rim portions 3, 5 and the narrow hub and rim portions 4, 6 are gapped adjacent respective ends of the wide portions over a relatively small arc (say, about 60° in the hub) at opposite ends of the slot 10. The gap 1a–1b in the hub portion 3 and the gap 2a–2b in the rim portion 5 are radially aligned with each other and a corresponding gap in the web to form a wedge shaped gap through a portion of the body. A second wedge shaped gap is formed by the similar radially aligned gaps 1c–1d and 2c–2d. However the pair of wedge shaped gaps are offset angularly about the axis of the body. Thus the narrow portions 3, 4 of the hub or inner ring 1 overlap over an arc subtending about 60° at the axis of the spacer. The narrow portions 5, 6 of the rim or outer ring also overlap but, as shown in FIGURES 1 and 4, the gaps 2a–2b and 2c–2d are of less angular extent—say, about 45° each—than the corresponding gaps in the hub. The peripheral length of each gap 1a–1b and 1c–1d is such as to permit the passage, with elastic distortion of the spacer, of a reinforcement rod.

In order to place the spacer on a reinforcement rod, the overlapping narrow portions 3, 4, 5, 6 of the rings, with their associated web segments 8, 9, are splayed apart to embrace the rod which is then forced obliquely through the thus enlarged slot 10 until it enters the hub 1. The spacer is then twisted to lie in a plane radial to the rod, the resilience of the spacer material causing the narrow hub and rim portions 3, 4, 5, 6 and their associated web segment 8, 9 to spring back to their normal positions as shown in FIGURE 2. The rod is thus completely encircled by the full-width and overlapping narrow portions of the hub 1, and the spacer cannot be forced radially off the rod.

FIGURES 5 and 6 illustrate possible alternative arrangements of the gaps in the hub 1 and the rim 2 of the spacer, each of the views being represented as a section on a plane immediately behind and parallel to the end plane of the spacer. The angular extents and positions of the gaps in the hub 1 and rim 2 lying behind the plane of section are marked by the curved arrows A. In each figure, the gaps 2a–2b and 2c–2d in the rim effectively meet on a radial plane normal to the plane of section, so that there is zero overlap of the narrow portions 5, 6 of the rim 2, but the narrow portions 3, 4 of the hub 1 overlap to an arcuate extent represented by the distance between the points 1b and 1d.

In both figures, the rim 2 is effectively continuous so far as its spacing function is concerned, but the gaps 2a–2b and 2c–2d are much larger in FIGURE 5 than in FIGURE 6. Although generally desirable, it is not essential that there should be effective continuity of the rim 2, and the narrow portions 5, 6 may terminate, at their free ends 2b, 2d, respectively, before any overlap occurs. The peripheral distance between these ends 2b, 2d will, of course, be governed partly by considerations of the spacing function to be carried out by the rim.

Preferably the web 7 is provided with holes 11 through which the concrete can squeeze, so that discontinuities in the concrete due to the presence of the spacer will be reduced to a minimum. Moreover, the web 7 may be strengthened by the provision of spokes 12 extending radially between the inner ring or hub 1 and the outer ring or rim 2, or the web may even be entirely or partly replaced by such radial spokes.

Furthermore, in order to offer the smallest possible bearing surface particularly inside a shuttering, the outer ring or rim 2 may be formed with external transverse ribs 13. Finally, the inner ring or hub 1 may be shaped to present one or more internal notches 14 which permit the accommodation of ribbed or noncircular section reinforcements such as Tor bars.

A typical spacer according to the present invention may have the following dimensions:

|  | Inches |
|---|---|
| External rim diameter | 15/16 |
| Internal hub diameter | 3/8 |
| Hub and rim width (full) | 3/8 |
| Hub and rim width (narrow) | <3/16 |
| Height of hub 13 | 1/16 |

The full width of the hub may be greater than that of the rim 2.

If desired, the rim 2 may be polygonal instead of circular. The term "wheel-like" used herein is deemed to embrace such a shape.

I claim:
1. A spacer for a concrete reinforcing rod comprising a one piece, wheel-like body of a resiliently flexible material having a hub for closely embracing said rod, a rim for spacing said rod from an adjacent component, and a web joining said hub and rim, angularly substantially coextensive peripheral arcs of said hub and web being split by a slot substantially perpendicular to the axis of said body and extending inwardly from the periphery of the rim substantially to a diameter of said wheel-like body to form narrow hub and rim portions on each side of the slot, said narrow hub and rim portions and said webs having a pair of radial gaps extending therethrough offset from one another and disposed at opposite ends of said slot.

2. A spacer for a concrete reinforcing rod comprising a one piece, wheel-like body of a resiliently flexible material having a hub for closely embracing said rod, a rim for spacing said rod from an adjacent component and a web joining said hub and rim, said hub and rim each having a peripherally uninterrupted arc presenting a solid, relatively thick portion, both said arcs being subtended by a common angle at the axis of the hub, the remainders of the peripheries of the hub and rim being interrupted by a slot substantially perpendicular to the axis of the hub to form a pair of axially spaced thin hub portions and a pair of similarly spaced thin rim portions, the corresponding thin hub and rim portions which extend angularly from the same end of said thick portions of the hub and rim terminating short of the other ends of said thick portions to provide a pair of angularly displaced wedge shaped gaps passing through both said hub and said rim and so disposed that at least parts of said thin hub portions are in peripheral overlapping relation, whereby the thin portions of said rim may be axially spread to permit entry of a reenforcing rod into said slot and the spacer then twisted to receive the rod in the bore of said hub for retention against radial displacement by reason of the bore being surrounded to the full extent of 360° by said thick and peripherally overlapping thin portions of the hub.

3. A spacer according to claim 2 wherein said common angle subtended by the solid hub and rim portions is approximately 180°.

4. A spacer according to claim 3 wherein said thin hub portions peripherally overlap by approximately 60° of arc.

5. A spacer according to claim 4 wherein said wedge shaped gaps in said thin hub and rim portions extend over an arc of about 60°.

6. A spacer according to claim 2 wherein said web is thinner than the thin portions of the hub and rim.

7. A spacer according to claim 2 wherein said thick hub and rim portions are united by a thin web portion, and said corresponding thin hub and rim portions are also united by thin web portions.

8. A spacer according to claim 7 wherein apertures are provided through said thin web portions.

References Cited by the Examiner

UNITED STATES PATENTS 3,191,345  6/1965  Schwachula _____ 52—689

FOREIGN PATENTS 612,486  1/1961  Canada.
876,459  5/1953  Germany.
518,524  2/1940  Great Britain.
639,038  6/1950  Great Britain.
778,918  7/1957  Great Britain.

FRANK L. ABBOTT, *Primary Examiner.*

M. O. WARNECKE, *Assistant Examiner.*